Figures 1, 2:
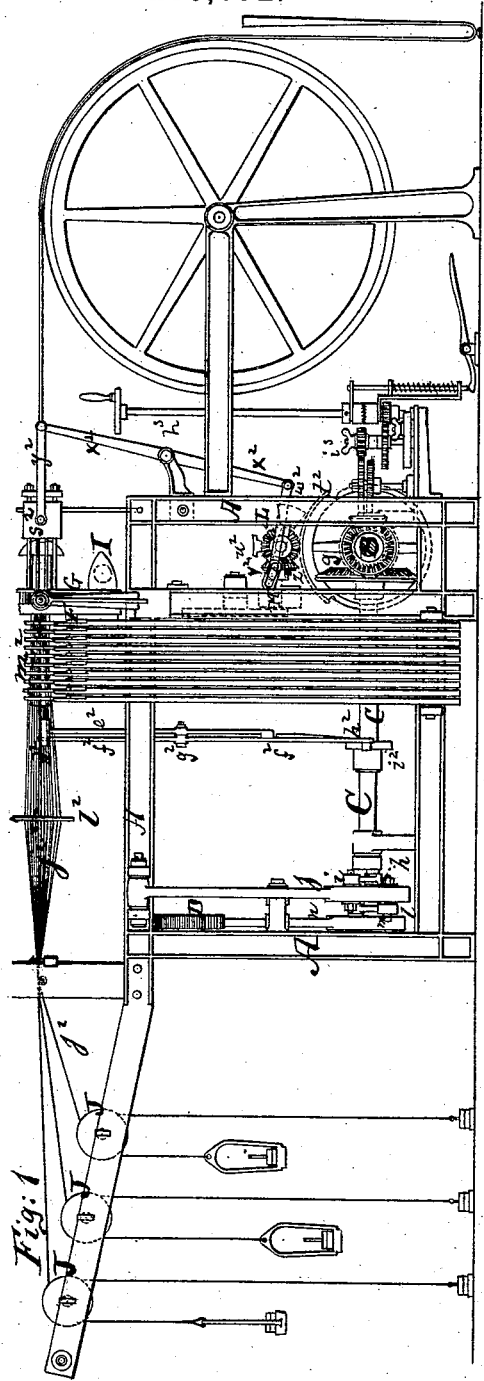

(No Model.) 4 Sheets—Sheet 1.

A. URBAHN.
LOOM FOR MAKING FRENCH HARNESS.

No. 289,872. Patented Dec. 11, 1883.

Witnesses
John C. Trunbridge
Harry M. Tunk

Inventor:
A. Urbahn
by his attorneys
Briesen & Betts (No Model.) 4 Sheets—Sheet 2.
A. URBAHN.
LOOM FOR MAKING FRENCH HARNESS.
No. 289,872. Patented Dec. 11, 1883.
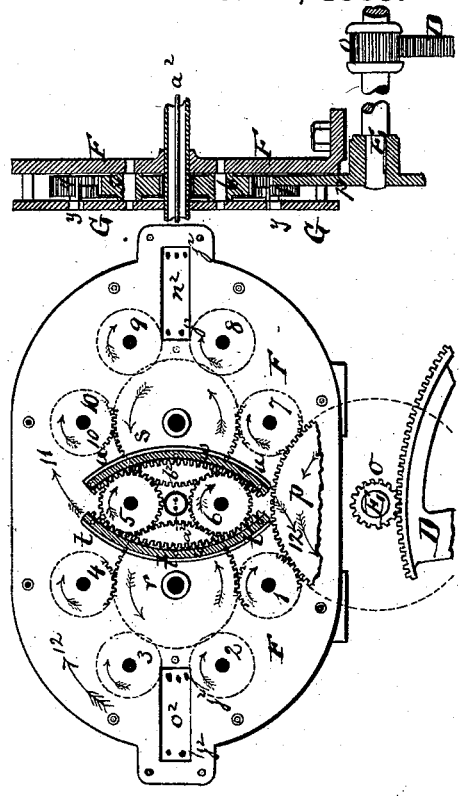
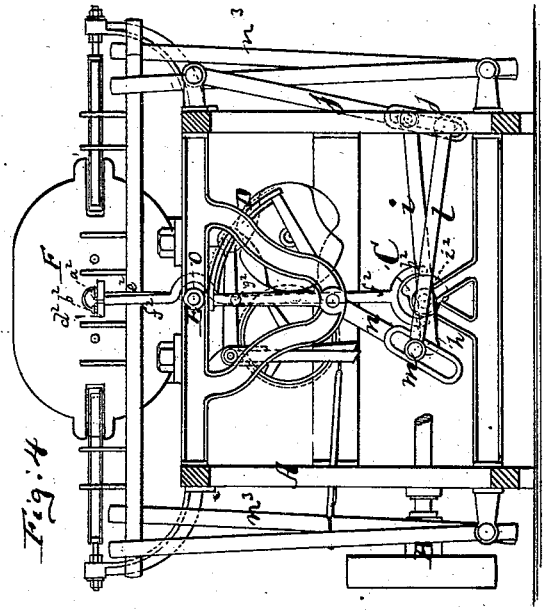
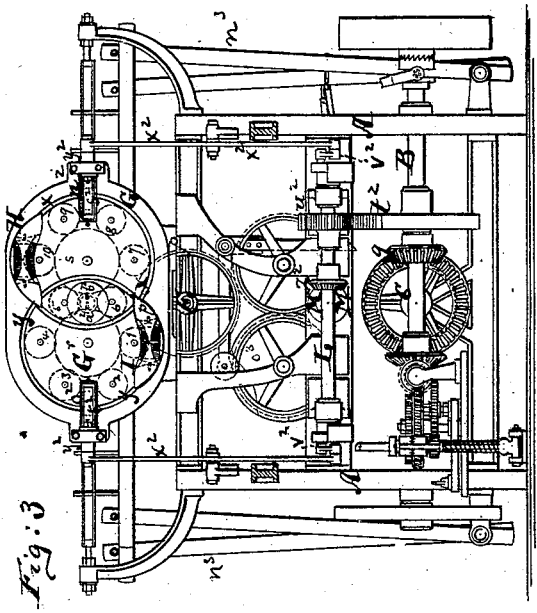
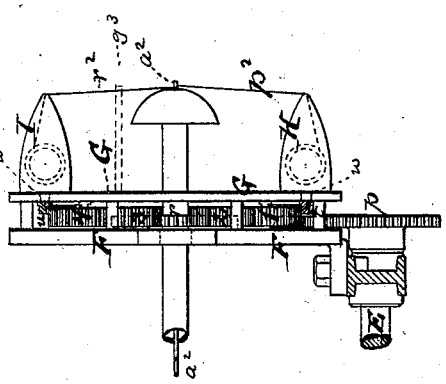
Witnesses
John C. Tunbridge.
Harry M. Turk
Inventor:
A. Urbahn
by his attorneys
Briesen & Betts (No Model.) 4 Sheets—Sheet 3.
A. URBAHN.
LOOM FOR MAKING FRENCH HARNESS.
No. 289,872. Patented Dec. 11, 1883.
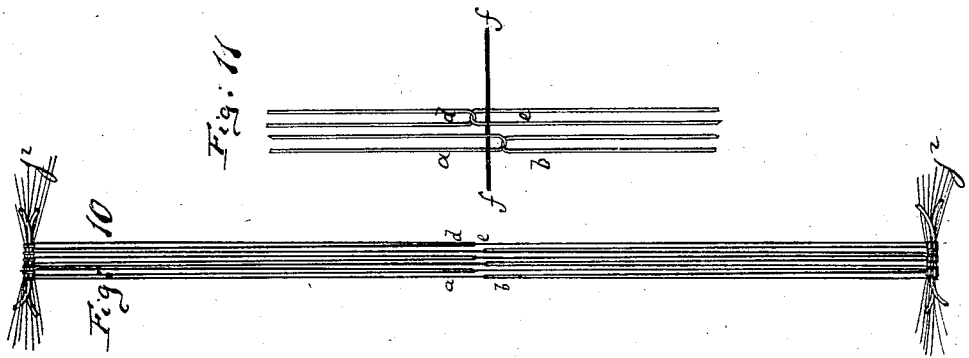
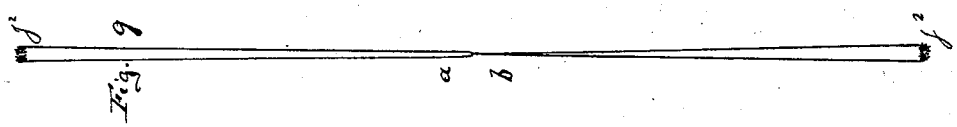
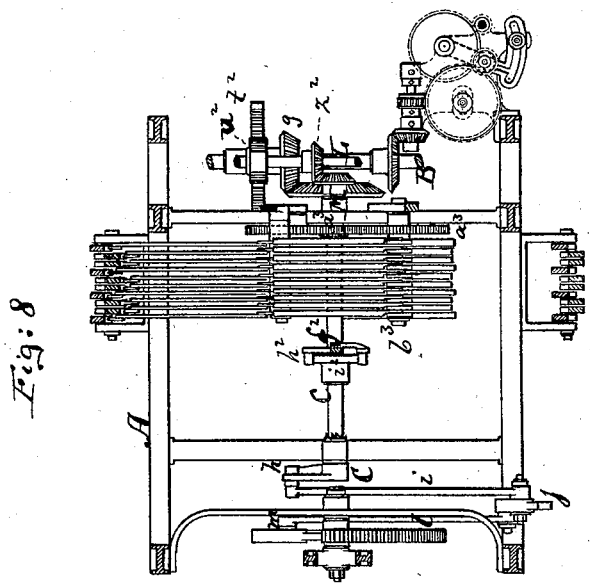
Witnesses:
John C. Tunbridge.
Harry M. Turk
Inventor:
A. Urbahn
by his attorneys
Briesen & Betts (No Model.) 4 Sheets—Sheet 4.
A. URBAHN.
LOOM FOR MAKING FRENCH HARNESS.
No. 289,872. Patented Dec. 11, 1883.
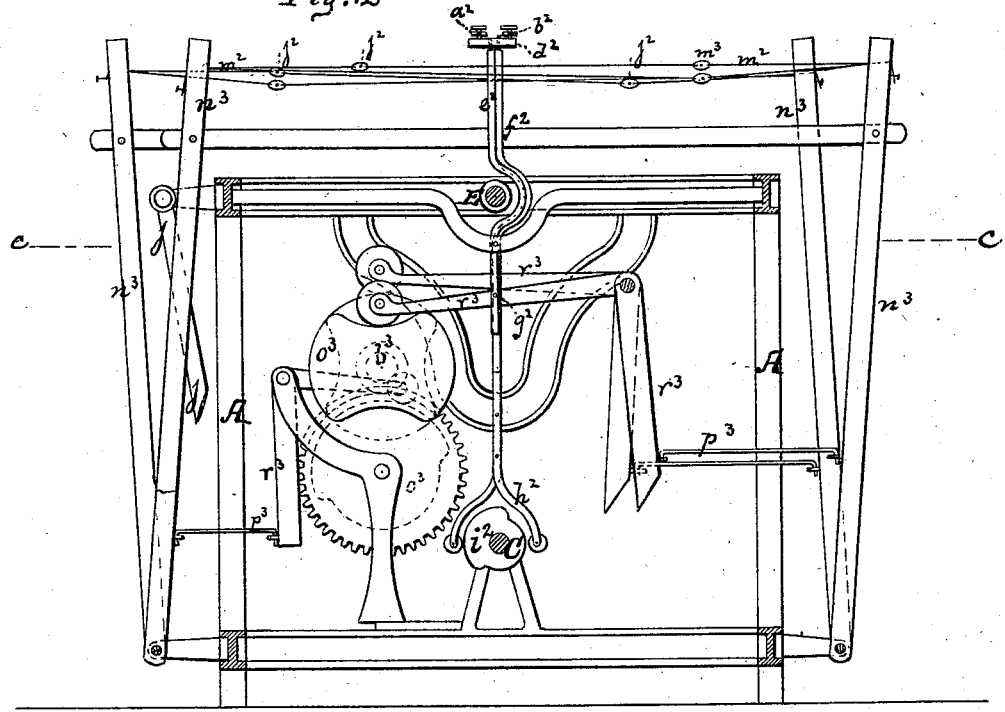
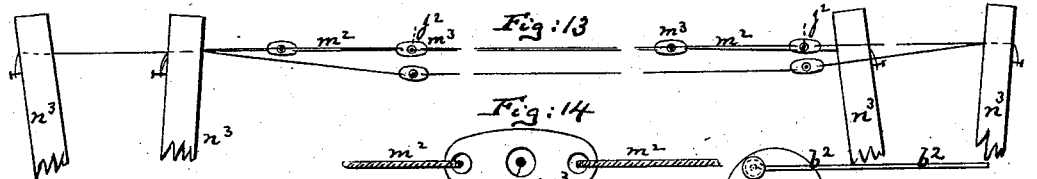
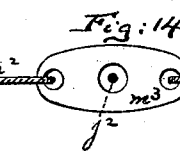
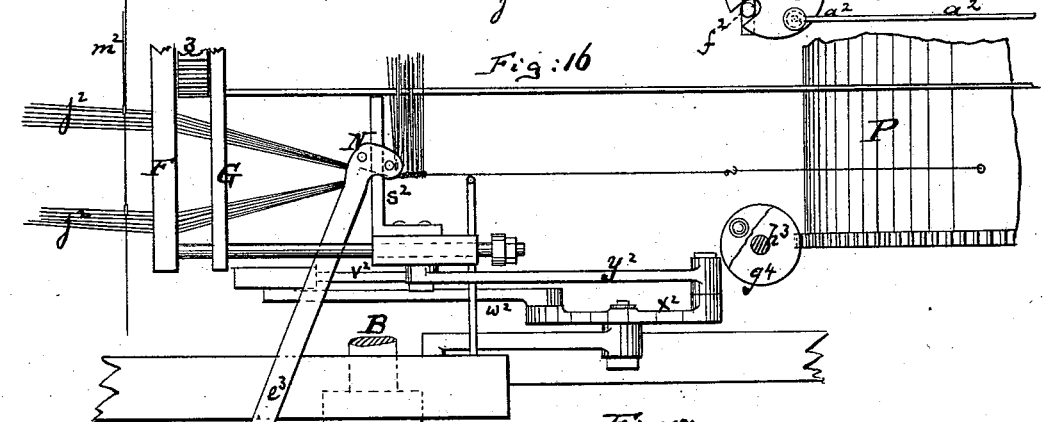
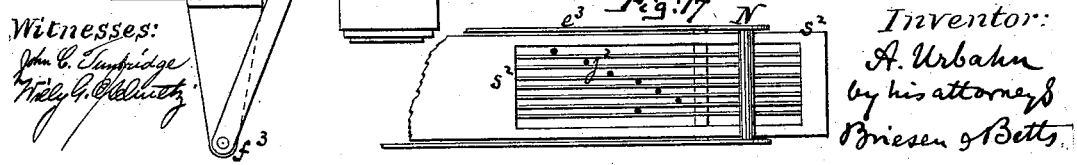
Witnesses:
John C. Tunbridge
Wely G. Oldwitz
Inventor:
A. Urbahn
by his attorneys
Briesen & Betts

UNITED STATES PATENT OFFICE.

ALWILL URBAHN, OF PATERSON, NEW JERSEY, ASSIGNOR OF ONE-HALF TO JACOB WALDER, OF SAME PLACE.

LOOM FOR MAKING FRENCH HARNESS.

SPECIFICATION forming part of Letters Patent No. 289,872, dated December 11, 1883.

Application filed December 12, 1882. (No model.)

*To all whom it may concern:*

Be it known that I, ALWILL URBAHN, of Paterson, in the county of Passaic and State of New Jersey, have invented an Improved Loom for Making French Harness, of which the following is a specification.

Figure 1 is a side view of my improved loom for making French harness. Fig. 2 is a plan or top view of the same. Fig. 3 is a front elevation of the same, the take-up roller being removed and its supporting-frame in section; Fig. 4, a rear view of the same, the warp-beam being removed and the frame shown in section; Fig. 5, an enlarged edge view of the shuttle-operating mechanism; Fig. 6, an enlarged sectional face view of said shuttle-operating mechanism; Fig. 7, an enlarged vertical cross-section of said shuttle-operating mechanism. Fig. 8 is a horizontal section on the plane of the line $c\ c$, Fig. 12. Fig. 9 is an end view of the French harness made on my machine; Fig. 10, a face view of the same; Fig. 11, a diagram showing how the threads of the French harness interloop near the center. Fig. 12 is a vertical cross-section, on a larger scale, of the loom on the line $K'\ K'$, Fig. 2. Fig. 13 is an enlarged front view of the harness in the loom. Fig. 14 is a still larger face view of the eye of the harness. Fig. 15 is an enlarged top view of the needles or rods $a^2\ b^2$ and disk $d^2$. Fig. 16 is an enlarged top view of the reed and stretcher and parts adjoining the same. Fig. 17 is a face view of the reed and of part of stretcher.

The object of this invention is to produce a loom for making the heddles or harness known as "French" harness, each heddle of which is composed of two interlooping threads, as more clearly indicated in Fig. 11, which figure shows the central portion of two of the heddles of such harness. In one heddle shown in this figure the thread $a$ is looped into the thread $b$ below the center line of the harness, and in the other heddle shown therein the thread $d$ is looped into the thread $e$ above the center line of the harness. The warp-thread $f$ of the loom in which such harness is to be employed is passed through the loop of thread $a$ in one heddle and through the loop of thread $e$ in the other heddle, being thereby retained and prevented beyond certain limited play from moving up or down, except as the two heddles, which are raised or lowered simultaneously, are moved. The point of connection between the threads $a$ and $b$ engages the said warp-thread $f$ on the under side thereof, and the point of connection between the threads $d$ and $e$ engages the said warp-thread on the upper side thereof, and between the stops thus formed the said thread $f$ is confined. Such harness has heretofore been used on looms, and has usually been produced at great expense by hand.

My invention relates to looms for making that kind of a harness; and it consists more particularly in the combination, in one mechanism, of two shuttles traveling in circular interlocking tracks, with certain reciprocating pins, the shuttles being arranged to lay the respective shuttle-threads around said pins, and thereby interlock the threads. For example, one shuttle carries the thread $a$, and the other the thread $b$, the thread $b$ will be carried through the track described by the shuttle laying the thread $a$, and thus the two threads will be caused to interlock.

The invention also consists in further details of mechanism by which the shuttles are moved, the fabric is stretched, and the requisite alternation in the extent of the loops above and below the track for the warp $f$ produced, all as hereinafter more fully described.

In the accompanying drawings, the letter A represents the frame of my improved loom. B is the main driving-shaft hung in that frame, and connected with suitable machinery to receive rotary motion. This shaft B is geared by beveled-gear wheels $g$ into a longitudinal shaft, C, which, at its rear end, carries a crank, $h$, that connects by a link, $i$, with a lever, $j$, (see Fig. 4,) the lever $j$ being thereby vibrated on its fulcrum. The lever $j$ connects by another link, $l$, with a pin, $m$, that enters the slotted lower end of the arm $n$ of a pivoted toothed segment, D, so that the vibratory motion of the lever $j$ is imparted to the segment D, the latter being moved more equally by the mechanism $i\ j\ l$ than it would be if the crank $h$ took directly into the slot of the arm $n$. The segment has on its periphery a series of gear-teeth, which engage into a pinion, $o$, on a longitudinal shaft, E, to which shaft, by the mechanism already described, reciprocating rotary motion is imparted—that is to say, it is first turned in one direction and afterward in opposite direction. The front end of the shaft E carries a toothed wheel, $p$, which is indicated in Fig. 3. This toothed wheel $p$, of which a portion is shown in Fig. 6, gears into two pinions, 1 and 7, that are hung between two plates, F and G, which plates are fixed to the framing A, and are placed face to face across the loom and bolted together, so as to have between them a space wide enough to admit of a series of pinions like pinions 1 and 7. There are, as appears from Fig. 6, ten such pinions between the plates F and G, the same being marked, respectively, 1 2 3 4 5 6 7 8 9 10, and they are ranged in two circles around two toothed wheels, $r$ and $s$, in such a manner that the pinions 1 to 6, inclusive, all gear into the wheel $r$, and the pinions 5 to 10, all gear into the wheel $s$. Of course, the number of these pinions may be modified, and is not necessarily such a number as will insure six pinions of the ten to gear into each of the wheels $r$ and $s$. The object of these many pinions is to insure their contact with two arched racks, $t$ and $u$, which are of such length as that each is always in gear with at least one, but generally with two, of these pinions, as indicated in Fig. 6. These racks $t$ and $u$ are also contained between the plates F and G, and gear into said pinions, as shown. It will be clear that if the wheel $p$ revolves in the direction of the arrow placed upon it in Fig. 6, the pinions 1 to 10 will all revolve in the direction of the arrows placed upon them, respectively, in the same figure, whereas the wheels $t$ and $u$ will both revolve in the same direction as does the wheel $p$. The result will be that the rack $t$, which is part of a circle of which the axis of the wheel $s$ forms the center, will be revolved in the direction of the arrow 11, around the pinions 5 10 9 8 7 6, and that the rack $u$, which describes an arc of a circle of which the axis of the wheel $r$ is the center, revolves in the direction of the arrow 12, around the pinions 6 1 2 3 4 5. Each of these racks $t$ and $u$ has a projecting rib, $w$, that extends through a circular slot of the plate G, there being two such slots (marked, respectively, $x$ and $y$) that cross each other, as shown in Fig. 3; and on the outer face of the plate G each of these ribs $w$ is, by suitable bolts or pins, united to a shuttle, the rack $t$ to a shuttle, H, and the rack $u$ to a shuttle, I. (See Figs. 3 and 5.) From what has been stated, it is clear that the shuttle H will revolve in the direction of the arrow 11, and the shuttle I in the direction of the arrow 12, the paths of the two shuttles crossing each other, so that the shuttle-thread laid by the one will be interlooped with that laid by the other.

In the center of the space that is inclosed between the crossing tracks or slots $x$ and $y$ is a pair of reciprocating rods or needles, $a^2$ and $b^2$, that are capable of being moved longitudinally—that is to say, so as to extend forward of the plate G sufficiently far to come into the way of the threads that are laid by the shuttles. These two rods or needles $a^2$ and $b^2$ are placed in the same plane in which lie the axes of the wheels $t$ and $u$. The object of these rods or needles, which are alternately brought into use, is to form an abutment around which the thread carried by each shuttle is laid. Thus the threads carried by the shuttles H and I are first laid around one needle—say $a^2$—to form the connection between the loops $a$ and $b$, Fig. 11, and afterward around the other needle, $b^2$, to form the connection between the loops $d$ $e$, Fig. 11. It follows that only one of said needles $a^2$ and $b^2$ must project from the plate G at one time and that the other must be out of the way. To this end the following mechanism is employed. The rear ends of the needles or pins $a^2$ $b^2$ are pivoted or jointed in suitable manner to a disk, $d^2$, (see Fig. 2,) to which disk oscillating motion is imparted—that is to say, the said disk is pivoted upon the upper end of a fixed shaft or support, $e^2$, and at a point eccentric to the axis of the pivoted disk it engages with a lever, $f^2$, which is pivoted at $g^2$, and which is forked at its lower end, as shown at $h^2$ in Figs. 4 and 12, said forked end embracing a cam, $i^2$, that is mounted upon the shaft C. During the revolutions of this shaft C the cam $i^2$ will cause the lever $f^2$ to vibrate on its pivot $g^2$, and thereby to oscillate the disk $d^2$ and push one of the needles out and draw the other in, as shown in Fig. 2, where the needle $b^2$ is shown pushed out into the path of the shuttle-threads, whereas the pin $a^2$ is withdrawn. Of course, in order to get the requisite amount of thread laid around these pins $a^2$ $b^2$, the gearing must be such that at every revolution of the shaft C each shuttle must twice make one and a half revolutions—that is to say, the shuttle H, for example, must revolve around the axis of wheel $s$ from the position shown in Fig. 3, so as to first arrive at the same position and then diametrically below it, and afterward back in opposite direction from the lowermost position, describing one circle, until it again arrives in the lowermost position, and then until it again reaches the position shown in Fig. 3.

In describing this mechanism, especially with reference to Fig. 6, certain arrows have been shown to indicate the direction of movement of the parts. This, of course, has reference only to such direction as results from a given motion of the wheel $p$. But inasmuch as that wheel $p$ receives its motion from the oscillating segment D, its own revolution will be reversed from time to time, and with it that of each of the wheels which it controls and that of the shuttles.

It remains to show how the threads that form the loops $a$ $b$ $d$ $e$, Fig. 11, are united at the ends of the French harness where they ought to be interwoven with suitable warp-threads $j^2$. (See Fig. 10.) These warp-threads are taken from beams J, carried through a suitable back reed, $l^2$, thence through the eyes $m^3$ of the harness $m^2$, and thence through slots $n^2$ and $o^2$, that are formed through the plates F and G, as shown in Figs. 3 and 6—that is to say, the slot $n^2$ is in the path of the shuttle H between the pinions 8 and 9, and the slot $o^2$ is in the path of the shuttle I, between the pinions 2 and 3, and one set of warp-threads for one end of the French harness passes through the slot $n^2$, while the other set of warp-threads for the other end of the French harness passes through the slot $o^2$, the shuttle H carrying its shuttle-thread $p^2$ through the warp-threads that traverse the slot $n^2$, while the shuttle I carries its thread $r^2$ through the warp-threads that traverse the slot $o^2$. The warp-threads that pass through each of these slots are arranged and separated by their harness vertically, one above the other, and, by preference, for giving the French harness to be produced proper strength at the ends, one or more of these warp-threads may be quite thick, and, in fact, in the form of cords; but I do not limit myself to any particular thickness of any or all of said warp-threads nor to their numbers. The harness $m^2$ is moved horizontally by levers $n^3$, that are shown in Fig. 12, and which are moved by rods $p^3$, that join the said levers $n^3$ with elbow-levers $r^3$, which bear on cams $o^3$, that are revolved by means hereinafter described. When the harness $m^2$ opens the sheds it does so in a horizontal direction, so as to leave some of the warp-threads on the inner side and some on the outer side of the path of the shuttle, and afterward the shed closes and reverses the position of these threads, so as to cause the shuttle and warp threads to interlock in the usual manner of making woven fabrics. The warp-threads that have passed the slot $n^2$ and $o^2$ next pass each through a reed, $s^2$, (there being one such reed on each side of the loom,) which reed receives horizontal, longitudinal reciprocating motion, so as to be carried back far enough to clear the path of the shuttle and allow the shuttle-thread to be interlocked with the warp-thread in front of the reed. After that this reed $s^2$ is moved forward into the position shown in Figs. 2 and 16, so as to beat the weft (or interwoven shuttle-threads) home with proper force. The mechanism for moving these reeds $s^2$ is indicated in Figs. 1 and 3, and consists of a toothed segment, $t^2$, which is mounted upon the shaft B, and which gears into a pinion, $u^2$, that is mounted on a shaft, L, so that this shaft L receives intermittent rotary motion in one direction. The shaft L has a crank, $v^2$, at each of its ends, which connect by links $w^2$ and levers $x^2$ with rods $y^2$, that take hold of the reeds $s^2$, so as to give them the reciprocating motion in rapid strokes. By bevel-gearing $z^2$ the shaft L imparts motion also to a longitudinal shaft, M, which, by suitable toothed wheels $a^3$, revolves a shaft, $b^3$, (see Fig. 8,) that carries the cams $o^3$ by which the heddles $m^2$ are reciprocated in manner already stated.

There may be two shafts carrying cams $o^3$, as indicated in Fig. 12, such shafts being geared together, or more than two such shafts may be employed.

In order to stretch the shuttle-threads that form the loops $a\ b\ d\ e$ of the French harness, Fig. 11, and equalize the lengths of the weft in the fabric provided on my machine, and insure the loops that are formed by the interlocking shuttles to be properly aligned and properly spaced, I have provided each side of the loom with a stretching mechanism, which is to stretch the threads $p^2$ and $r^2$ after they have interlocked with the warp-threads $j^2$, and just at the time that the reed $s^2$ has reached its frontmost position in beating home the last shuttle-thread laid, which is also the moment when the heddles $m^2$ cause the warp-threads to change. This stretcher is a forked rider, N, placed over the reed $s^2$, as shown in Figs. 2, 16, and 17. The rider N is on the inner side of the warp $j^2$, and is connected to a rod, $e^3$, which is pivoted at a fixed point, $f^3$, to the frame of the machine. When the reed $s^2$ moves backward toward the heddles $m^2$, the rider N or stretcher is carried farther inward away from the warp-threads, and does not affect them; but when afterward the reed $s^2$ moves outward or forward to beat home the last shuttle-thread laid, the rider is, by the same motion, carried outwardly—that is, toward the warp—and crowds it outward, so that, there being two such riders, both crowding against both warps simultaneously, the weft or shuttle threads that unite the warps will be stretched, and the result above indicated obtained.

The take-up drum P can be moved by a worm, $g^4$, engaging into teeth on the take-up drum P, or by other suitable means. The shaft which carries the worm $g^4$ is marked $h^3$, and may, as in Fig. 1, gear through toothed wheels $i^3$ and a worm into a bevel-pinion on shaft B.

I do not propose to limit myself, in view of the fact that I believe this machine to be new in the essential features hereinafter described, to any particular mechanism for revolving the two interlocking shuttles for moving the stretchers or reeds, or the needles $a^2$ and $b^2$; and I desire it to be fully understood that the particular mechanism for moving the parts which I have described is only one form in which I can clothe my invention, other forms being readily suggested to competent mechanics.

The main feature of invention, in my estimation, so far as I am acquainted with looms, is the use of the two shuttles traveling in interlocking paths, in combination with the inner abutting or loop-forming pins or needles, $a^2$ and $b^2$. How the motion of these parts is obtained seems immaterial.

I desire it also to be understood that when, for any reason, a greater length of shuttle-thread is to be produced on the machine, this can be done by placing suitable fixed pins on the face-plate G, so as to project outward from the plate G farther than do the shuttles, so that the shuttle will lay its thread over such pin or pins. One such pin is indicated by dotted lines at $g^3$ in Fig. 5.

I claim—

1. The combination of the two shuttles H and I, and mechanism, substantially as described, for moving them on tracks that cross each other in the same plane with the pins or needles $a^2$ and $b^2$, and mechanism, substantially as described, for moving said pins, and for moving the warp-threads around which said shuttles are carried, substantially as herein shown and described.

2. The shuttles H and I, combined with mechanism, substantially as described, for moving them on tracks that cross each other in the same plane, in combination with the pins or needles $a^2$ and $b^2$, and mechanism, substantially as described, for moving said pins or needles, mechanism for holding and moving the warp-threads $j^2$, substantially as described, stretchers N N, and reeds $s^2$, and means for operating the same, substantially as specified.

3. The plates F and G, having slots $n^2$ and $o^2$, combined with pinions 1 2 3 4 5 6 7 8 9 10, toothed wheels $r\ s$, racks $t\ u$, and shuttles H and I, means for operating the warp-threads $j^2$ in said slots, pins or needles $a^2\ b^2$, and means for operating said pinions, substantially as described.

ALWILL URBAHN.

Witnesses:
WILLY G. E. SCHULTZ,
JAMES TURK.